Figure 1:
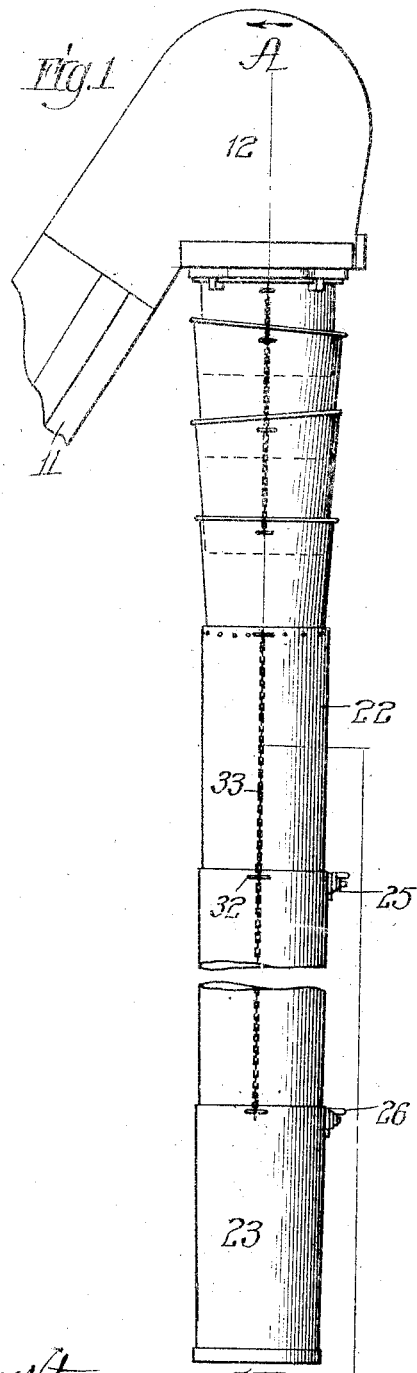

No. 883,109.  
J. H. GILMAN.  
FLEXIBLE SPOUT.  
APPLICATION FILED NOV. 4, 1907.

PATENTED MAR. 24, 1908.

2 SHEETS—SHEET 1.

Witnesses:

Inventor:
John H. Gilman,
by John Howard McElroy
his Atty.

No. 883,109. PATENTED MAR. 24, 1908.
J. H. GILMAN.
FLEXIBLE SPOUT.
APPLICATION FILED NOV. 4, 1907.
2 SHEETS—SHEET 2.
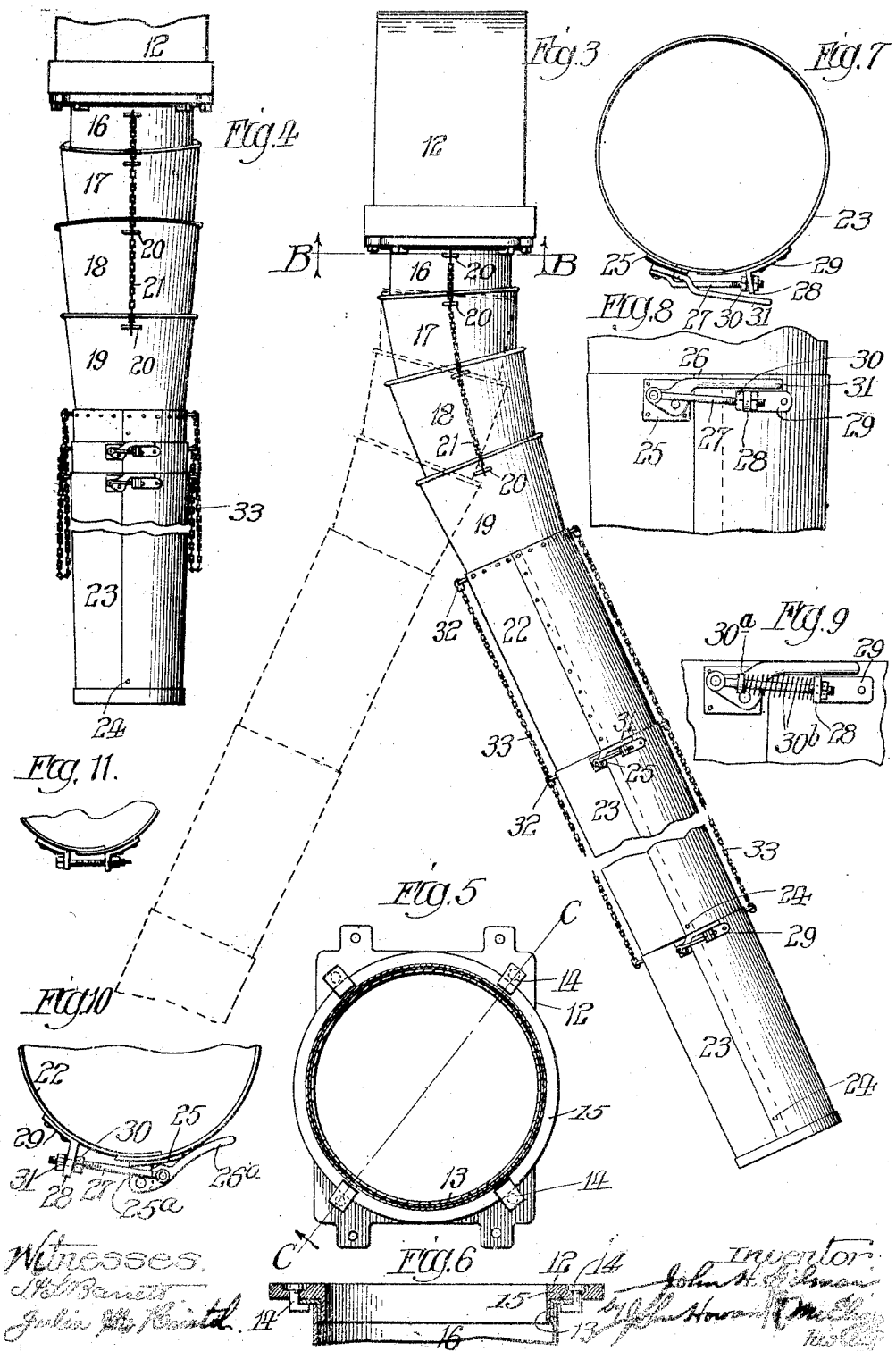

UNITED STATES PATENT OFFICE.

JOHN H. GILMAN, OF OTTAWA, ILLINOIS, ASSIGNOR TO KING & HAMILTON COMPANY, OF OTTAWA, ILLINOIS, A CORPORATION OF ILLINOIS.

FLEXIBLE SPOUT.

No. 883,109.   Specification of Letters Patent.   Patented March 24, 1908.

Application filed November 4, 1907. Serial No. 400,477.

*To all whom it may concern:*

Be it known that I, JOHN H. GILMAN, a citizen of the United States, and a resident of Ottawa, in the county of Lasalle and State of Illinois, have invented certain new and useful Improvements in Flexible Spouts, of which the following is a full, clear, and exact specification.

My invention is concerned with certain improvements in extensible grain spouts, and is designed to overcome some of the difficulties that have been met with in the practical operation of these devices. As they have been constructed prior to my invention, the straight portion (as distinguished from the elbow portion, which can bend) has been made up of solid tubular sections, and in order to make them properly support each other when extended in a substantially straight tube, as is necessary where the spout lies anywhere near laterally in discharging grain therethrough, it was necessary to make the tube sections in the form of true cylinders of gradually increasing diameters from the top to the bottom sections, so that they would fit snugly. But the sections must necessarily be made of thin sheet-metal, and in the severe use to which they are subjected, they soon became dented, and would not then telescope readily. To overcome this difficulty, I have made my present invention, and in carrying it out, I employ sheet-metal sections which are preferably slightly conical in form (although they might be truly cylindrical,) and which are expansible and contractible at their receiving ends, so that they can be expanded to permit the sections to be telescoped, and contracted when the sections are extended so as to secure them firmly into a substantially rigid tube. To this end I make each section with its overlapping edges riveted only at the bottom or discharge end and with a tightening clamp at its upper end, so that it can be contracted and secured upon the lower end of the section above it, and I preferably make the clamp adjustable, so that the tension it exerts can be varied as desired.

To illustrate my invention, I annex hereto two sheets of drawings, in which the same reference characters are used to designate identical parts in all of the figures, of which,—

Figure 2:
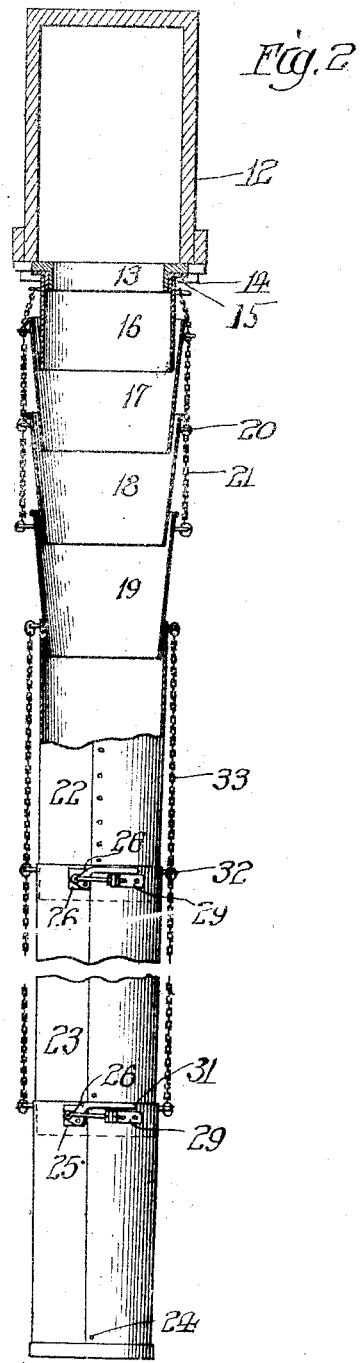

Figure 1 is a side elevation of a telescoping spout embodying my invention, secured to the discharge end of an elevator; Fig. 2 is a vertical section on the line A—A of Fig. 1; Fig. 3 is a front elevation showing the spout deflected to the right in full lines, and to the left in dotted lines; Fig. 4 is a view showing the spout telescoped as it would be in moving it from place to place; Fig. 5 is an inverted plan view, on an enlarged scale, in section on the line B—B of Fig. 3; Fig. 6 is a detail in section on the line C—C of Fig. 5; Fig. 7 is a top plan view, on an enlarged scale, of one of the sections; Fig. 8 is a front elevation, on an enlarged scale, showing one of the sections clamped upon the adjacent section; and Figs. 9, 10 and 11 are details showing two modified forms of the clamping mechanism.

I have shown my invention as applied to the head 12 of the upper end of an elevator 11 of the portable type, although, of course, it will be understood that it might be applied elsewhere. In applying it to such a head, I secure on the discharge end 12 of the head the downwardly-projecting annular-flange 13, through which end 12 pass the hooks 14, which can be turned into and out of position to engage with the horizontal, annular flange 15, which is preferably formed from a strip of angle iron secured to the interior of the uppermost section 16, which is of cylindrical form and of sheet metal. The adjacent sections 17, 18 and 19 form the elbow portion of the spout, and are conical in shape, so that the spout can be flexed at this point, in the customary manner. In order to telescope these sections, they are provided on each side with the rings 20 to which the chains 21 are secured, as is customary in this class of devices. To the lowermost conical section 19 is preferably rigidly secured the cylindrical section 22 which forms the first section of the straight portion of the spout.

The portion of the apparatus thus far described is old and well known, and forms no part of my present invention.

As I have previously explained, in prior similar structures, the telescoping sections below the section 22 were true cylinders, and they increased in diameter from the uppermost to the lowest one, so that they could telescope freely and yet be tight enough to form a tolerably rigid tube when they were extended. It is obvious that these tubes, being made of thin sheet-metal, were bound to become dented as the spout was shifted from one position to another, as is necessary in their use, they being employed principally to distribute grain along the length of a crib to the top of which the elevator extends. To overcome this difficulty, instead of making the lower sections 23 solid, I secure the overlapping edges, preferably, by a single rivet 24 at the bottom, although they might be riveted for a considerable distance from the bottom toward the top, although such a structure would not be so advantageous. On one side of the seam at the upper end, I secure the curved base-plate 25, and upon this I pivot the locking lever 26, which has pivoted to the short arm thereof the link 27 which passes through the outwardly-projecting portion of the ear 28, the curved base-portion 29 of which is pivoted to the pipe on the opposite side of the seam from the base plate 25 to allow the link 27 to swing as the lever 26 is swung from one position to the other. Or the same result might be obtained by riveting the ear 28 to the pipe and making the aperture in the ear 28 enough larger than the link 27 to permit the necessary play. The end of the link 27 passing through the ear 28 is preferably threaded, as shown, and provided with the nuts 30 and 31 on either side of the ear, so that the tightness of the clamp may be readily regulated. If a yielding clamping pressure is desired, I may employ the substitute shown in Fig. 9, where for the nut 30 I substitute a fixed nut or abutment 30ª, and interpose between this nut 30ª and the ear 28 the helically-coiled expanding spring 30ᵇ. Instead of having the lever 26 swing vertically, I may pivot it on an outwardly-projecting ear 25ª, as shown in Fig. 10, so the the lever can swing horizontally, instead of vertically. In both cases, it will be noted that the lever swings the link 27 past the center in opening and closing, so that it is securely held in either position.

In Fig. 11, I illustrate a further, but less desirable modification, in which the two sides are connected merely by a threaded rod and nut, which accomplishes the same purpose, but in a less convenient and quickly operated structure.

While the sections 23 might be true cylinders, with the larger ones at the bottom so that they will telescope, I preferably make them very slightly conical, with the smaller end at the bottom, as their expansibility at the top will permit of them nesting as much as is necessary to shorten them when the spout is closed. Of course, the sections 22 and 23 will be provided with the customary eyes 32 and the chains 33 connected thereto in the customary manner to hold the sections together whether they be telescoped or extended.

The operation of the apparatus will be readily understood. The elevator is moved up alongside of the crib, and the extended spout is directed to some portion of the crib, and after that portion is filled, it is swung in the necessary direction to fill another portion, and so on. During the filling operation, the spout can be shortened or extended, as is necessary, and when it is to be removed to another crib, it, of course, will be telescoped so as to make it short and readily handled. When the straight part is extended, the levers 26 are swung to their clamping position, and the sections 23 are then clamped together so as to form a substantially rigid tube.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a discharge spout, the combination with the split section permanently secured at one end and provided with an expansible securing means at the other end, and a companion section with which the expansible end coöperates, said securing means consisting of the curved base plate secured to the cylinder on one side of the split portion, an ear secured on the other side, a lever pivoted on the base plate, a link pivoted on the lever at one end and passed through the ear at the other end, and provided with abutments on either side of the ear, substantially as described.

2. In a discharge spout, the combination with the split section permanently secured at one end and provided with an expansible securing means at the other end, and a companion section with which the expansible end coöperates, said securing means consisting of the curved base plate secured to the cylinder on one side of the split portion, an ear secured on the other side, a lever pivoted on the base plate at one end and passed through the ear at the other end, and provided with adjustable abutments on either side of the ear, substantially as described.

3. In a discharge spout, the combination with the split section permanently secured at one end and provided with an expansible securing means at the other end, and a companion section with which the expansible end coöperates, said securing means consisting of the curved base plate secured to the cylinder on one side of the split portion, an ear secured on the other side, a link pivoted on the lever at one end and passed through the ear at the other end, and provided with adjustable abutments on either side of the ear, consisting of nuts threaded on the end of the link, substantially as described.

4. In a discharge spout, the combination with the split section permanently secured at one end and provided with an expansible securing means at the other end, comprising link and lever connections adapted to be swung past a center and a companion section with which the expansible end coöperates, said securing means being adjustable to vary the firmness with which one section clamps the other, substantially as described.

5. In a discharge spout, the combination of a plurality of telescoping sections with connecting means for preventing their entire separation longitudinally, some of said sections consisting of split sections permanently secured at one end and provided with an expansible securing means at the other end by which they may be clamped upon an adjacent section.

6. In a discharge spout, the combination of a plurality of telescoping sections with connecting means for preventing their entire separation longitudinally, some of said sections consisting of the slightly conical truncated split sections permanently secured at the smaller end, and provided with an expansible securing means at the larger end for clamping them upon an adjacent section.

7. In a discharge spout, the combination of a plurality of telescoping sections with connecting means for preventing their entire separation longitudinally, some of said sections consisting of split sections permanently secured at one end and provided with an expansible securing means at the other end by which they may be clamped upon an adjacent section, said securing means consisting of a locking clamp adapted to be secured in an open or a closed position.

8. In a discharge spout, the combination of a plurality of short conical sections provided with connecting means for preventing their entire separation longitudinally, said sections being adapted to form an elbow portion, with a plurality of telescoping sections, with connecting means for preventing their entire separation longitudinally, some of said sections being composed of split tubes permanently secured at one end and provided with an expansible securing means at the other end whereby they may be clamped upon adjacent sections.

9. In a discharge spout, the combination with a plurality of short conical sections provided with connecting means for preventing their entire separation longitudinally, said sections being adapted to form an elbow portion, with a plurality of telescoping sections, with connecting means for preventing their entire separation longitudinally, some of said sections being composed of slightly conical truncated split tubes permanently secured at their smaller end and provided with expansible securing means at the larger end whereby they may be securely clamped upon adjacent sections.

10. In a discharge spout, the combination with a plurality of short conical sections provided with connecting means for preventing their entire separation longitudinally, said sections being adapted to form an elbow portion, with a plurality of telescoping sections, with connecting means for preventing their entire separation longitudinally, some of said sections consisting of the split sections permanently secured at one end and provided with an expansible securing means at the other end, said securing means consisting of a locking clamp adapted to be secured in an open or a closed position.

11. In a discharge spout, the combination with a plurality of short conical sections provided with connecting means for preventing their entire separation longitudinally, said sections being adapted to form an elbow portion with a plurality of telescoping sections, with connecting means for preventing their entire separation longitudinally, some of said sections consisting of the split sections permanently secured at one end and provided with an expansible securing means at the other end, said securing means consisting of a locking clamp adapted to be secured in an open or a closed position and being adjustable to vary the firmness with which one section clamps the other.

In witness whereof, I have hereunto set my hand and affixed my seal, this 28th day of October, A. D. 1907.

JOHN H. GILMAN. [L. S.]

Witnesses:
CLARENCE GRIGGS,
AUGUST LEDRICH.